United States Patent
Jönsson

(10) Patent No.: US 7,134,009 B2
(45) Date of Patent: Nov. 7, 2006

(54) PORTABLE SET-UP DEVICE AND METHOD FOR A COIN HANDLING OR VALUABLE PAPER HANDLING MACHINE

(75) Inventor: Manfred Jönsson, Staffanstorp (SE)

(73) Assignee: Scan Coin Industries AB

( * ) Notice: Subject to any disclaimer, the term of this patent is extended or adjusted under 35 U.S.C. 154(b) by 354 days.

(21) Appl. No.: 10/689,473

(22) Filed: Oct. 20, 2003

(65) Prior Publication Data

US 2004/0186937 A1 Sep. 23, 2004

Related U.S. Application Data

(60) Provisional application No. 60/422,018, filed on Oct. 29, 2002.

(30) Foreign Application Priority Data

Oct. 21, 2002 (SE) ................................... 0203131

(51) Int. Cl.
G06F 9/22 (2006.01)
(52) U.S. Cl. .......................... 713/1; 194/353
(58) Field of Classification Search ................ 194/353; 713/1; 717/168
See application file for complete search history.

(56) References Cited

U.S. PATENT DOCUMENTS

| 4,376,442 A | 3/1983 | Gomez et al. |
| 5,091,713 A | 2/1992 | Horne et al. |
| 5,909,502 A | 6/1999 | Mazur ........................ 382/135 |
| 6,039,645 A | 3/2000 | Mazur |
| 6,463,528 B1 | 10/2002 | Rajakarunanayake et al. . 713/1 |
| 6,805,634 B1* | 10/2004 | Wells et al. ................... 463/42 |
| 6,896,116 B1* | 5/2005 | Deaville et al. ............ 194/206 |

FOREIGN PATENT DOCUMENTS

| AU | 714452 | 1/2000 |
| AU | 719014 | 5/2000 |
| DE | 199 37 515 A1 | 2/2001 |
| EP | 1043699 | 10/2000 |
| EP | 1223563 | 2/2001 |
| GB | 2357620 | 6/2001 |

OTHER PUBLICATIONS

Sriniva Yarra, "USB OTG software frees dual-role handheld devices" EDN, vol. 47, Issue 11, p. 83, May 16, 2002.*

(Continued)

*Primary Examiner*—Thomas Lee
*Assistant Examiner*—Albert Wang
(74) *Attorney, Agent, or Firm*—Womble Carlyle Sandridge & Rice, PLLC

(57) ABSTRACT

A portable device is provided for configuring a machine of the type which handles coins or valuable papers and which has an interface for connecting an external unit, thereby allowing the machine to be configured from the external unit. The portable device has a control unit; a memory; a first interface adapted to be connected to said external unit; and a second interface adapted to be connected to the interface of said machine. The control unit is adapted, when the portable device is connected to the external unit via the first interface, to emulate said machine and to receive configuration data intended for said machine from the external unit and store it in the memory. The control unit is further adapted, when the portable device is connected to said machine via the second interface, to emulate the external unit and deliver said configuration data stored in the memory to said machine.

20 Claims, 8 Drawing Sheets

OTHER PUBLICATIONS

Coin Mechanisms Inc., "Customer Programming Module Instruction Manual", Aug. 26, 2002.*

Mars Inc., "Cashflow SC66 Operation & Maintenance Manual", 2003.*

Scan Coin AB 1991, Technical Manual, Cash Deposit System, Model CDS 600 & CDS 640.

Scan Coin AB 1992, Manual, CDS 600/640, MIB, Multiinterface Board.

* cited by examiner

PORTABLE SET-UP DEVICE AND METHOD FOR A COIN HANDLING OR VALUABLE PAPER HANDLING MACHINE

CROSS-REFERENCE TO RELATED APPLICATIONS

This application claims the benefit of Swedish patent application no. 0203131-8, filed Oct. 21, 2002, and also claims the benefit of U.S. Provisional patent application No. 60/422,018, filed Oct. 29, 2002.

INCORPORATION BY REFERENCE

The specification of Swedish patent application no. 0203131-8, filed Oct. 21, 2002, as well as the specification of U.S. Provisional patent application No. 60/422,018 are incorporated herein in their entirety, by this reference.

FIELD OF THE INVENTION

The present invention relates to machines for handling coins or valuable papers and, more specifically, to the configuration of such machines.

BACKGROUND ART

It goes without saying that machines of the kind stated above are known in the art. Examples thereof are coin sorters, coin counters, banknote counters, banknote readers, check readers, vending machines, gambling machines, ATMs, machines for testing the quality of coins, banknotes or checks, machines for identifying counterfeit or foreign coins/banknotes/checks, etc. Such machines usually comprise a large number of operating parameters, settings and the like, which can be referred to collectively as configuration data. Although a particular machine is configured at the factory, subsequent reconfiguring thereof at the site of operation may be necessary, for different reasons, on one or more occasions. Reconfiguring may include the need to update the software of the machine.

One example of a prior-art machine of the kind stated above is shown in FIG. 1 in the form of a coin sorter 100. The coin sorter 100 comprises a coin intake associated with a hopper-type coin feeding device 106 as well as a coin discriminator 108, a sorting device 110, a coin return means 112 and a plurality of coin cassettes 114. The machine 100 further comprises an internal microprocessor (CPU) or similar control unit, which in turn is connected to a memory, such as a RAM, ROM, EEPROM, flash memory, hard disk, or any combination thereof. The memory stores, inter alia, machine software to be executed by the microprocessor, and can also store configuration and working data for the coin discriminator 108 and the sorting device 110. One of the tasks of the software is to form a user interface together with a front display 102 and keypad 104.

FIG. 1 illustrates a prior-art method of configuring the coin sorter 100 to change, for example, its settings and/or update its software. A service engineer brings a portable computer 120 to the site of operation where the machine 100 is used. The computer 120 is connected to the machine 100 by means of, for example, a serial cable 124 between an RS232 interface on the computer and a corresponding RS232 interface on the machine. It may also be necessary for the service engineer to connect the computer 120 to the power grid through a power supply unit 122 to ensure that the service can be carried out even if the computer battery runs out. When the computer is installed, the service engineer first launches its operating system, for example Microsoft® Windows, and then an appropriate configuration application. Using the application the service engineer is then able to configure the machine 100. To use the configuration application in this way the service engineer must, of course, be qualified in the use thereof.

Examples of configuration data for the coin sorter 100 are help texts and menus for the display 102, or the equivalent for a printer installed on the machine (not shown in FIG. 1). Other examples are parameter values for the coin discriminator 108—such as different acceptance ranges within which a number of physical parameters relating to different coin denominations must fall for the coins to be considered valid. Such physical parameters can include, for example, conductivity, permeability, thickness, diameter or weight. One of many situations in which the machine 100 may need to be reconfigured is when it is to be used for a different currency, or when the coin system which the machine is set to handle is changed in any way.

The machine's software may need to be updated due to errors, performance deficiencies, or the like, or when the user has requested a new or additional functionality.

One problem with, and drawback of, the current configuration method is that it requires a qualified service engineer, who has to travel to the site of operation bringing a relatively heavy and bulky PC (including cables and power supply unit). Furthermore, connecting the computer and launching its operating system and the relevant application is time-consuming. Moreover, a sufficiently large working area is needed to set up the computer 120 adjacent to the machine 100.

SUMMARY OF THE INVENTION

One object of the present invention is to solve or at least alleviate the above problems and drawbacks. This object has been achieved, in brief, by the creation of a new type of configuration tool, viz. a portable device which is intended to be connected, in a first step, to a computer comprising said configuration application. In this position, the device emulates the machine for handling coins or valuable papers, and all settings made by the user of the configuration application are buffered in the portable device. At a later stage, the portable device is connected to the machine and emulates, in this position, the configuration application, the settings buffered in the portable device being executed on the machine. Similarly, the portable device can be used to update existing software in the machine.

By using this new configuration tool, i.e. a portable device according to the invention, a number of advantages are obtained. First, the configuration method is considerably simplified and, thus, the level of training required at the site of operation is reduced. It is no longer necessary for the highly qualified service engineer to travel to the site of operation, instead he or she can configure the portable device at his or her usual place of work. The device can then be delivered to the site of operation, where a non-qualified user can connect it to the appropriate machine, following which the configuration is carried out automatically. One advantage in this conjunction is that the portable device is suitably miniaturized into a very convenient format. Furthermore, the service time required at the site of operation is reduced, since it is no longer necessary to connect and launch a configuration computer.

More specifically, the above stated object is achieved by a portable device and methods according to the independent claims.

Thus, a first aspect of the invention is a portable device for configuring a machine of the kind which handles coins or valuable papers and which has an interface for connecting an external unit, thereby allowing the machine to be configured from the external unit. The portable device has a control unit; a memory; a first interface adapted to be connected to said external unit; and a second interface adapted to be connected to the interface of said machine, the control unit being adapted, when the portable device is connected to the external unit via the first interface, to emulate said machine and to receive configuration data intended for said machine from the external unit and store it in the memory, and the control unit being adapted, when the portable device is connected to said machine via the second interface, to emulate the external unit and deliver said configuration data stored in the memory to said machine.

The term configuring here comprises setting different parameters, reference data, language support and the like in the machine. It also comprises updating the machine software. However, it is not crucial to the invention that both of these steps should be included in the term configuring. Correspondingly, the term configuration data may comprise settings and/or parameters relating to validity/authenticity/denomination/type of coins and valuable papers, respectively; reference data; or language support data. Moreover, the term configuration data may comprise program code in machine-readable form, with which the software of the machine is to be updated.

The external unit may be a computer of the type including a portable computer, a personal computer, a handheld computer, a workstation or the like.

The first and second interfaces may be serial, for example according to the RS232 standard.

According to one embodiment, the control unit is further adapted, when the portable device is connected to said machine via the second interface, to receive operating data from said machine and store it in the memory and, when the portable device is connected to the external unit via the first interface, to transfer said operating data stored in the memory to the external unit.

Said operating data may comprise number/validity/-authenticity/denomination/type of coins and valuable papers, respectively, that have been handled by the machine, and/or physical parameters for such coins and valuable papers detected by the machine, and/or a service log for said machine.

Power may be supplied to the portable device from the first and second serial interfaces.

According to one embodiment, the first and the second interface form part of the same physical unit. In this embodiment, the portable device will have only one physical interface (such as an RS232 port) but nevertheless two logical interfaces, implemented by the control unit and sharing the same physical interface. The control unit will then be adapted to detect whether the portable device is connected to the external unit or to the machine, through the physical interface, and act accordingly by performing the functions set out above.

In other embodiments, the first and second interfaces may include physical interfaces of more than one kind, such as any combination of RS232, USB and Ethernet, and/or wireless interfaces like Bluetooth, WLAN, GSM, UMTS, CDMA 2000 and D-AMPS.

Advantageously, the machine described above can be a coin sorter or a coin counter.

A second aspect of the invention is a method of configuring a machine of the type which handles coins or valuable papers and which can be configured from an external unit. The method comprises the steps of connecting a portable device, other than said machine and said external unit, to said external unit; receiving configuration data intended for said machine from the external unit and storing it in the portable device; connecting the portable device to said machine; and delivering said stored configuration data to said machine.

A third aspect of the invention is a method of configuring a machine of the type which handles coins or valuable papers and which can be configured from an external unit, where the method involves the steps of providing a portable device, other than said machine and said external unit;

detecting, in said portable device, that said portable device is connected to said external unit;

emulating said machine by said portable device so as to receive configuration data intended for said machine from the external unit and store said configuration data in the portable device;

detecting, in said portable device, that said portable device is connected to said machine; and emulating said external unit by said portable device so as to deliver said stored configuration data to said machine.

The second and third aspects may have the same additional features as has been described above for the first aspect.

Further objects, advantages and features of the invention will appear from the following detailed description of the invention, the appended claims and the drawings.

BRIEF DESCRIPTION OF THE DRAWINGS

The invention will now be described in more detail, reference being made to the accompanying drawings.

DETAILED DESCRIPTION OF THE INVENTION

Figure 1:
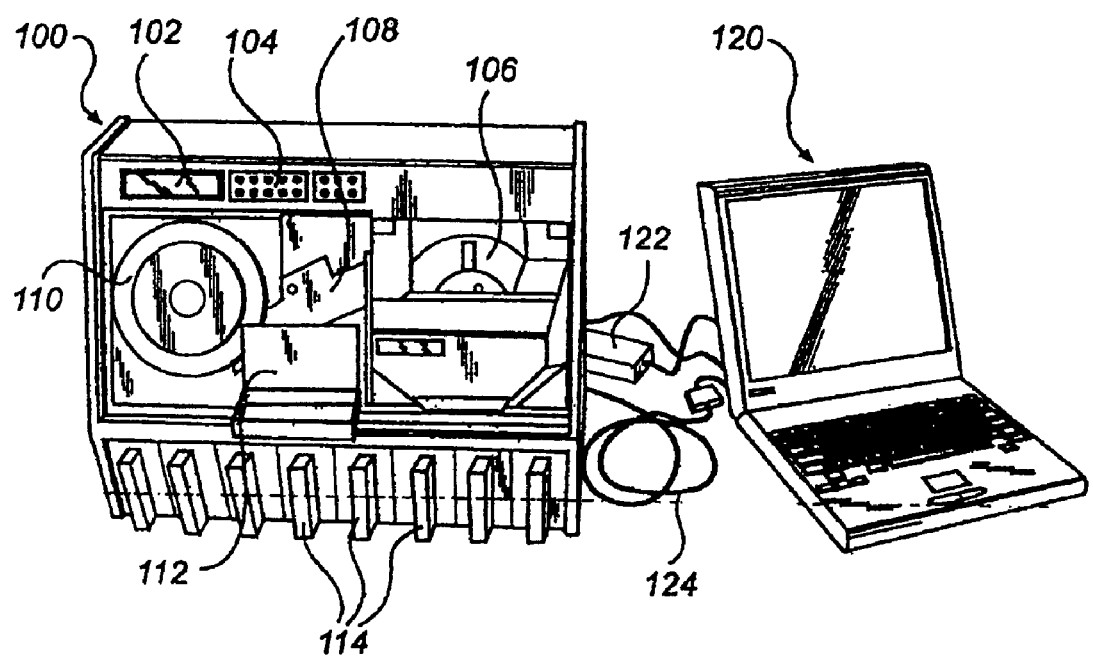
FIG. 1 illustrates a prior-art method of interconnecting a computer and a coin handling machine by means of a serial cable for the purpose of configuring the machine, for example to change its settings or update its software.
Figure 2:
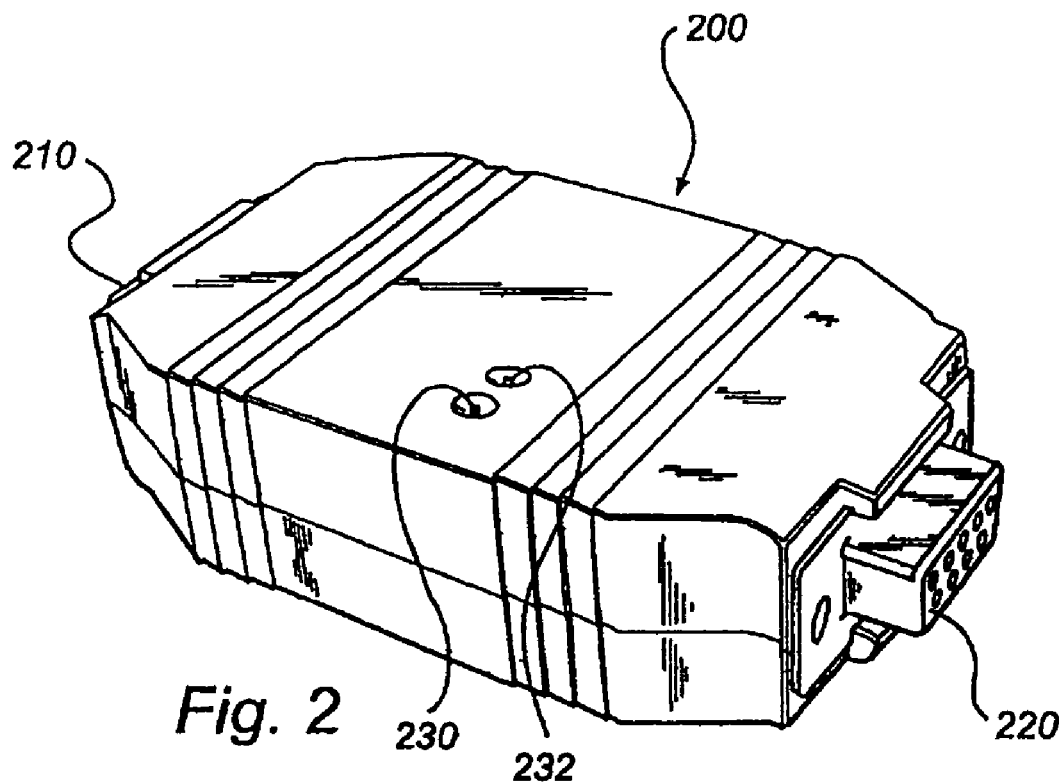
FIG. 2 is a perspective view of a portable device according to the invention for configuring the machine shown in FIG. 1, optionally also for recording operating data from said machine.
Figure 3:
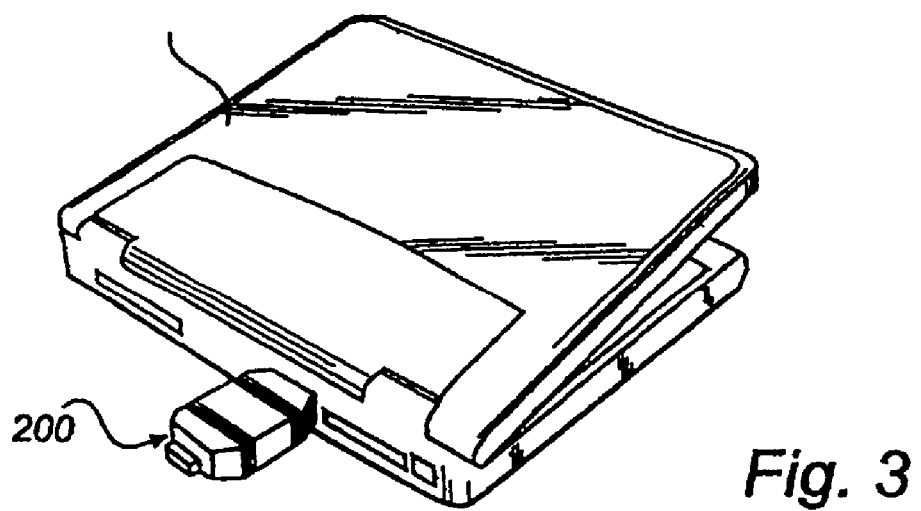
FIG. 3 illustrates the portable device of FIG. 2 connected to the computer shown in FIG. 1.
Figure 4:
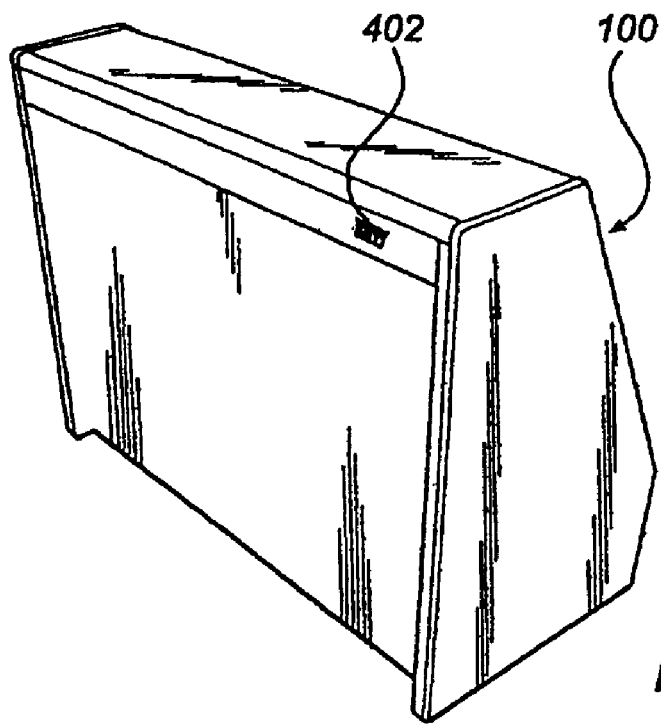
FIG. 4 is a rear view of the coin handling machine shown in FIG. 1.
Figure 5:
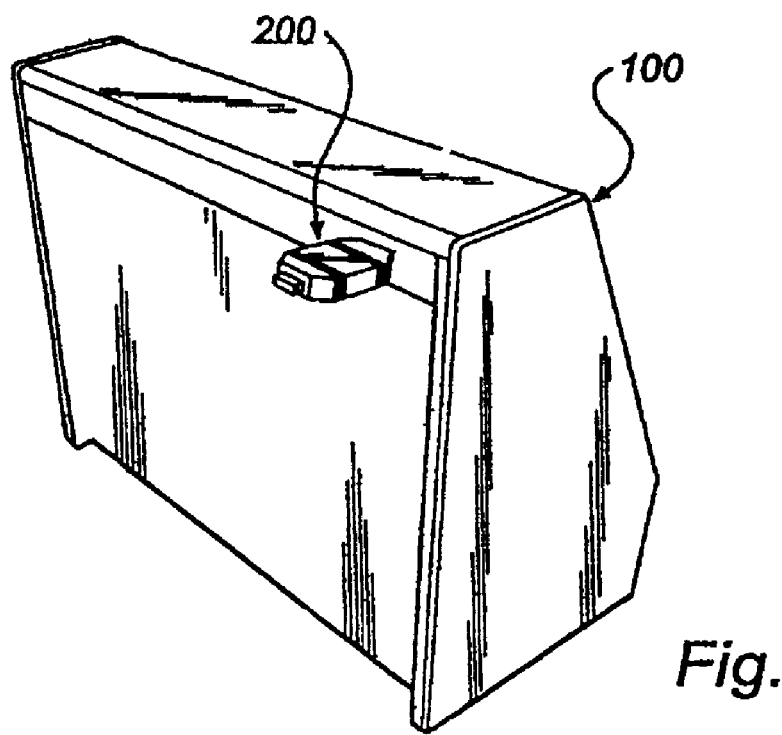
FIG. 5 illustrates the portable device of FIG. 2 connected to the machine shown in FIG. 1.

FIGS. 2–5 illustrate a typical use of a portable device 200 according to a preferred embodiment of the invention. As shown, the device 200 has the form of a small box based on an apparatus housing and having a first connector 210 at one end and a second connector 220 at the opposite end. In the preferred embodiment, the connectors 210, 220 are conventional 9-pin serial ports according to the RS232 standard. The first port 210 is adapted to be connected to a computer 120 (see FIG. 3), while the second port 220 is adapted to be connected to a corresponding interface 402 on a coin handling machine 100 (see FIGS. 4 and 5). In normal circumstances, the portable device 200 is not connected to both the computer 120 and the machine 100 at the same time, but first to the computer (in which state the device emulates the machine 100 and receives configuration data from the computer 120) and then to the machine (in which state the device emulates the computer and forwards said configuration data to the machine 100). However, the reverse procedure, i.e. first connecting it to the machine 100 and then to the computer 120 can be applied when using the device 200 to record operating data from the machine 100 for post-processing on the computer 120.

Figure 6:
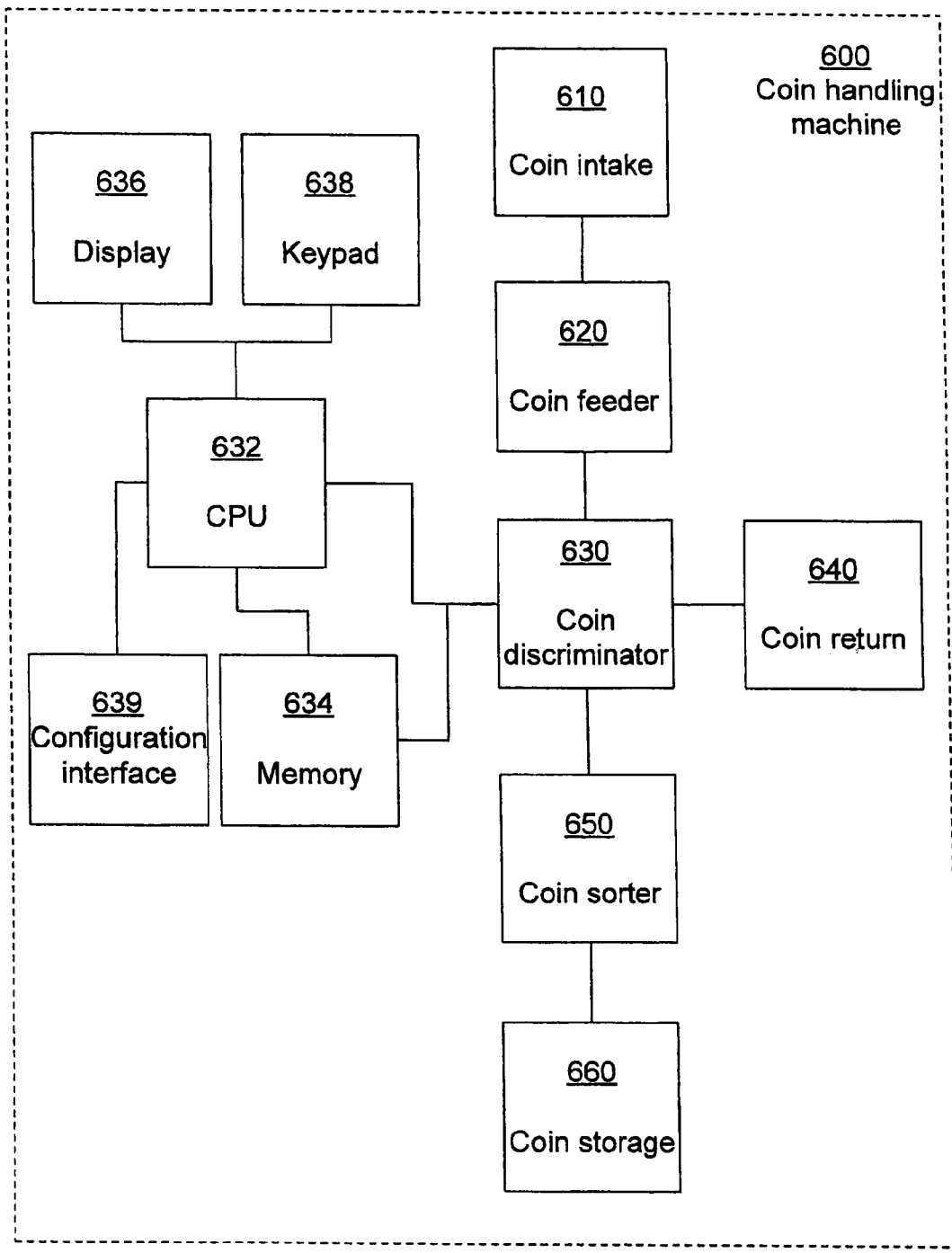
FIG. 6 is a block diagram of main components of the coin handling machine shown in FIGS. 1, 4 and 5.

FIG. 6 is a block diagram of the main parts of a coin handling machine 600, more specifically the coin sorter 100 shown in FIG. 1. However, the machine 600 could just as well be a coin or banknote counter, a vending machine, a gambling machine, an ATM (Automatic Teller Machine), a machine for testing the quality of coins, banknotes or checks, a machine for identifying counterfeit or foreign coins/banknotes/checks, etc.

A quantity of coins to be sorted by the machine 600 are deposited in a coin intake 610. The coins are transported via a coin feeder 620, for example a hopper-type coin feeding device (cf. 106 in FIG. 1) or a conveyor belt, to a coin discriminator 630 (cf. 108 in FIG. 1). The coin discriminator 630 is operatively connected to a control unit 632 in the form of a microprocessor (CPU) or the like, which in turn is operatively connected to a memory 634, such as a RAM, ROM, EEPROM, flash memory, hard disk, or any combination thereof. At least parts of the memory 634 can be implemented by internal memory in the control unit. The control unit 632 is in charge of the overall mode of operation of the machine 600, including controlling a display 636 and a key pad 638, which form a user interface (cf. respectively 102 and 104 in FIG. 1). The configuration data relating to the machine which the portable device according to the invention is intended to update is stored in the memory 634. A configuration interface 639 (cf. the serial port 402 in FIG. 4) allows new/modified configuration data to be received by the control unit 632 from the portable device 200 and to be stored in the memory 634.

The coin handling machine 600 further comprises a coin return unit 640 (cf. 112 in FIG. 1), which returns non-accepted coins through an external opening in the machine 600, so that the user can get such coins back. It is the coin discriminator 630 that, in this context, determines if a coin is to be accepted or not by detecting different physical parameters, which are used to determine the type, denomination, currency, identity, authenticity or the like of the coin. Examples of physical parameters are conductivity, permeability, thickness, diameter or weight. After the coin discriminator 630 a sorting device 650 (cf. 110 in FIG. 1) is provided which uses the coin-sensing results from the coin discriminator 630 to sort the coin into a particular coin container (cf. 114 in FIG. 1) associated with a coin storage. The coin containers of the coin storage 660 are advantageously accessible to the user from the outside.

The control unit 632 stores various operating data in the memory 634. One example of such data is coin statistics from the coin discriminator 630—in the form of the number of counted coins of each denomination, the number of rejected coins, or, in greater detail, statistics relating to the detected physical coin parameters. The configuration interface 639 allows this operating data to be transferred—also during operation—to the portable device 200 for "recording", for example, coin statistics. The recorded coin statistics can then be downloaded, at a later stage, from the portable device 200 to the computer 120 for analysis or other post-processing operations.

Figure 7:
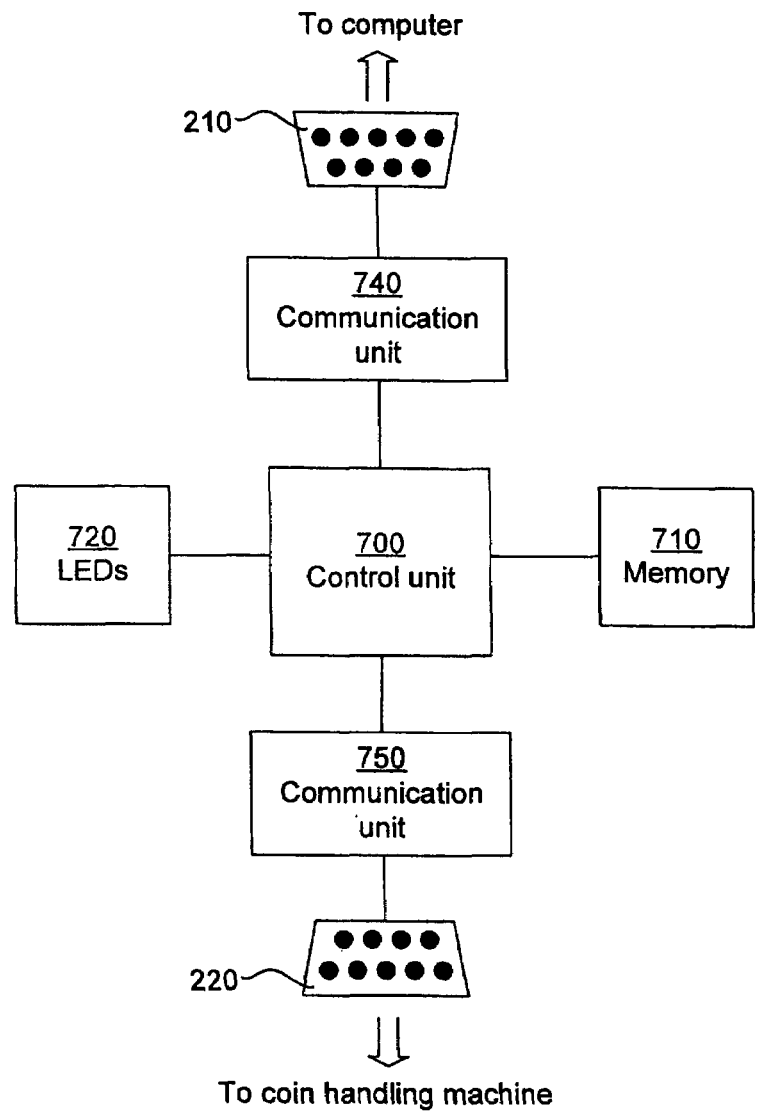
FIG. 7 is a block diagram of main components of the portable device shown in FIGS. 2, 3 and 5.

The portable device 200 is shown in the form of a block diagram in FIG. 7. All the components of the block diagram will be described in more detail below following a brief summary thereof. A control unit 700 handles the overall operation of the device and controls the other components. A memory 710 is associated with the control unit 700 and serves as working memory and program memory therefor. The memory 710 is also used to buffer configuration data that is received from the computer 120 before it is transferred to the machine 100, as well as to buffer operating data recorded from the machine 100 before it is transferred to the computer 120. A set of light emitting diodes 720 (also designated 230, 232 in FIG. 2) are adapted to indicate different operational states and fault states to the user. A first communication unit 740 is connected to the first serial port 210, while a second communication unit 750 is connected to the second serial port 220.

Since the device 200 emulates the machine 100 in relation to the computer 120, and vice versa, the communication via the communication units 740 and 750, respectively, follows the same general serial communication standard that is used conventionally between the computer and the machine (i.e. the situation shown in FIG. 1). A brief specification of this serial communication standard is provided below.

To connect a machine to a computer, an RS232 cable is used with the following connections:

| Computer | | | Machine | |
|---|---|---|---|---|
| 25 pins | 9 pins | Direction | 9 pins | Signal |
| 3 | 2 | ← | 3 | Tx |
| 2 | 3 | → | 2 | Rx |
| 7 | 5 | ↔ | 5 | GND |
| 4 | 7 | → | 8 | CTS (PC not ready) |
| 5 | 8 | ← | 4 | RTS (Machine not ready) |

When the machine is started it has the following default settings: 9600 baud, no parity, 8 data bits and 1 stop bit. Usually, the baud rate is then reset to 115200 band.

The handshake signals CTS (Clear To Send) and RTS (Request To Send) are used to control the flow. RTS is used by the machine to indicate when it is not ready to receive data from RX. If anything is sent while the RTS is active, a communication error may occur. To avoid this, the computer is capable of telling the machine that it is not permitted to send anything. This is done by setting the CTS active.

A configuration or "setup" software protocol is used for communication between the computer and the machine.

Such a protocol is generally designated PCcom. All messages sent between the computer and the machine has the same structure:

| Direction PC - Machine | Data |
|---|---|
| → | Escape characters (ESC 27) |
| → | Command characters ('A'–'Z') |
| → | Sub-command characters ('a'–'z' or 'A'–'Z') |
| ↔ | Data bytes |
| ↔ | CSUM, one-byte checksum |
| ← | ACK (6) if CSUM is OK |
|   | NAK (21) if CSUM is not OK |
|   | EM (25) if CSUM is OK and there is not enough data memory. |

Referring again to FIG. 7 and to FIG. 8, the portable device 200 will now be described in more detail. Its mode of operation will then be described with reference to FIGS. 9–11.

Figure 8:
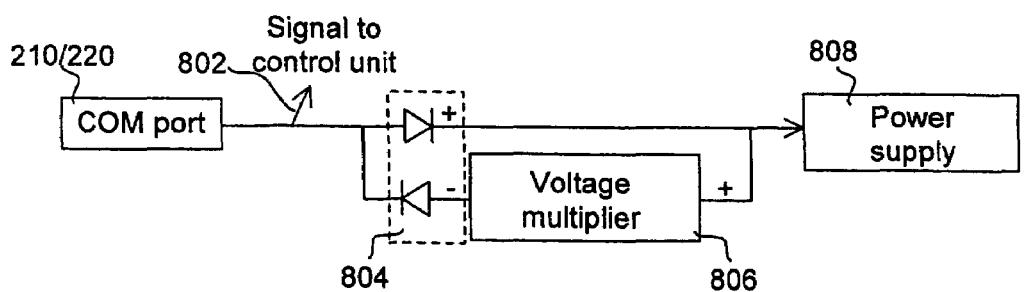
FIG. 8 is a block diagram of an arrangement for supplying power to the components shown in FIG. 7.

Power is supplied to the portable device 200 from the machine 100 and the computer 120, respectively, via the outputs on the serial ports 210, 220, as shown in FIG. 8. In normal circumstances, serial ports are used for communication purposes only, and it is therefore important not to destroy the communication signals. To separate the communication signal 802 from the power supply, diodes 804 are provided, the characteristics of which are such as to allow current to flow in one direction only. By using a voltage multiplier 806 (e.g. National Semiconductor LMC7660) a positive voltage can be obtained from a negative voltage for power supply 808 to the components of the device. The power supply 808 can comprise, inter alia, a voltage regulator, such as ST Microelectronics LE33ABZ, for conversion to a voltage level suitable for the components, for example 3.3 V.

The voltage range of the COM port according to the RS232 specification is +–25 V. However, this voltage range is not the same for all machines. Protective resistors may therefore be required on the input side.

In other embodiments the portable device may be power-supplied by an internal or external power source (such as a battery or a battery eliminator, respectively).

The control unit 700 can be implemented by means of a microcontroller MSP430F149 from Texas Instruments. This microcontroller has a very low current consumption. It consumes only 250 µA per MIPS at a supply voltage of 2.2 V and is designed primarily for applications with stringent requirements for a low power consumption. The supply-voltage range is 1.8–3.6 V. At a working frequency of 5 MHz the total current consumption for the microcontroller is about 1300 µA. The maximum working frequency is 8 MHz at 3.6 V. The architecture is based on a 16-bit RISC core with 27 instructions. Each instruction takes only one clock cycle. Thus, the instruction cycle time at 5 MHz is 0.2 µs.

The microcontroller has a 32-60 KB flash-type program memory and a 1–2 KB RAM-type working memory. Furthermore, it has an AD-converter, which is advantageously used for voltage monitoring and temperature measurement.

One advantage of the microcontroller MSP430F149 and its siblings in the 14x series is that it has two USART circuits (Universal Synchronous Asynchronous Receive Transmit). Thus, in the preferred embodiment the communication units 740 and 750 are implemented by means of such USART circuits, i.e. they are physically incorporated in the control unit 700.

It goes without saying that the control unit 700 can be implemented by means of a component other than the one proposed above, for example Atmel ATMEGA161L 8PI 0143, Atmel T89C51RD2 or Microchip PIC18LF452.

For the implementation of the memory 710, flash memories programmed in parallel or EEPROMs programmed serially may suitably be considered. The advantage of EEPROMs is that their current consumption when writing is very low compared with flash memories. Flash memories use so-called sectors. Since a sector in the flash memory must be erased before writing can take place, the sector has to be fetched to the control unit RAM. This means that the RAM memory must be at least as large as the sector size of the flash memory. In the preferred embodiment, a flash memory of the type SST SST28VF040A was selected. The capacity is 512 KB and the supply-voltage range is 2.7–3.6 V. In the preferred embodiment, two physical memory modules are used, which gives a total capacity of 1024 KB. The memory access time is 150–200 ns, which is less than the access time of the selected control unit. The memory can be overwritten 100 000 times, and the information will remain for 100 years. Other conceivable memories 710 are, for example, Microchip 24LC515, Microchip 25LC640, ST Microelectronics M95256-V or Atmel AT29BV040A.

At least parts of the memory 710 can be implemented by means of internal memory in the control unit, for example the program memory (flash) and the working memory (RAM) in the microcontroller MSP430F149.

Figure 9:
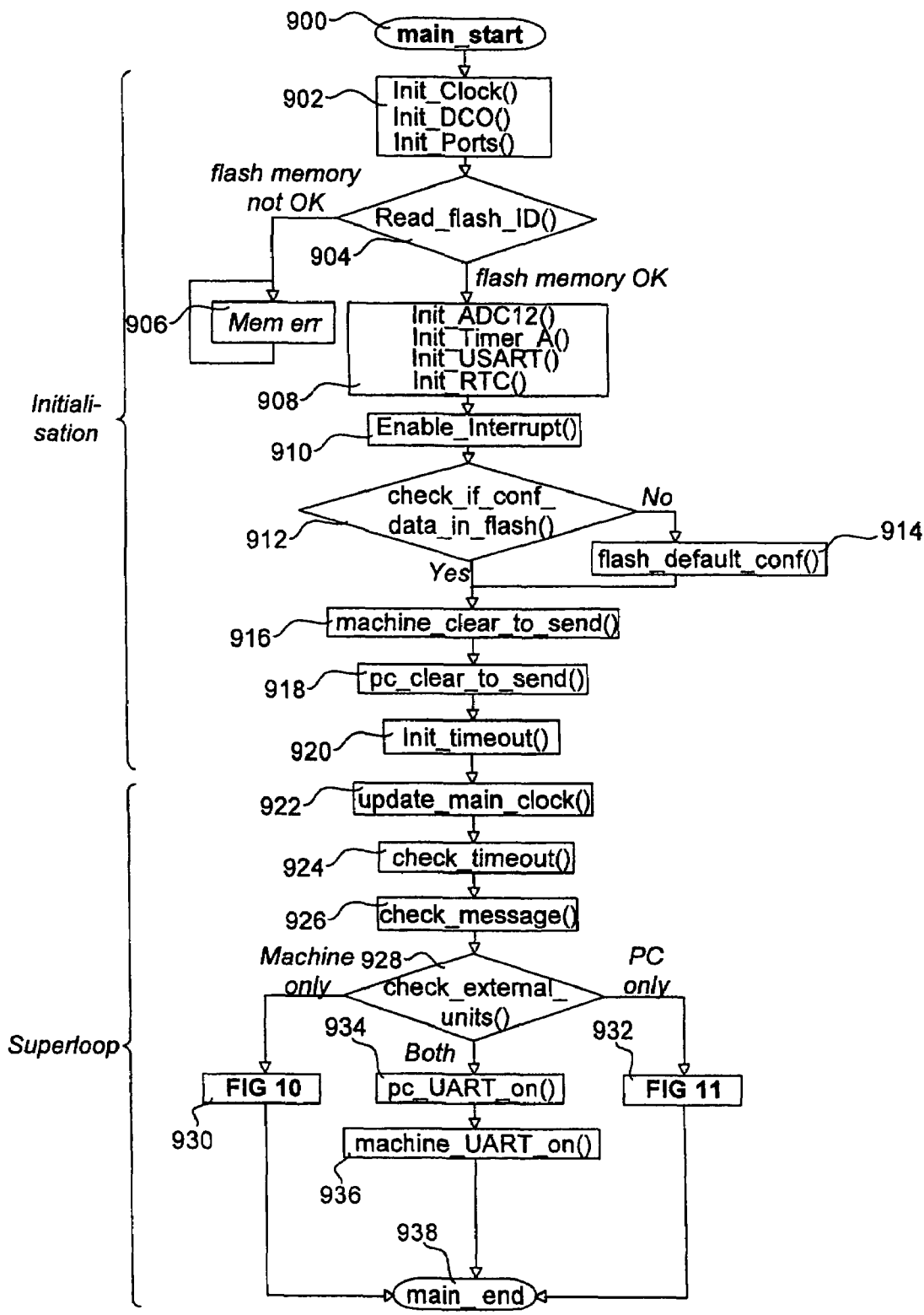
FIG. 9 is a flowchart of a main routine for the portable device according to FIGS. 2, 3, 5 and 7.

The portable device is operated by software as will now be described. The mode of operation of the software is illustrated in FIG. 9 and is based on the principle of throughput. Following an initialization, the program enters a "superloop". The program makes several thousands of cycles every second. The cycle speed is dependent on what happens at a particular moment. The superloop must be faster than the limiting factor, which in this case is the speed of communication. The program could be regarded as a kind of state machine.

Each "block" always returns to the superloop and, thus, never locks the execution in infinite loops. One exception is if an error in the external memory is detected during initialization. In this case, it is not convenient for the initialization to continue since the remaining program code is dependent on the function of the external memory.

The task of the superloop is to monitor, for each cycle, the state of the different software blocks. The superloop is the mastermind of the software and is at the top of the hierarchy. For instance, it decides when it is time to write to the external memory or when it is time to communicate. To carry out its task it relies on software buffers, time measurement functions, interrupt functions, function pointers and communication units. There are also monitor clocks that continuously check that nothing is wrong.

Information from the computer is received by means of an interrupt. The interrupt is stored in a 20 byte intermediate buffer. A circular write-pointer owned by the interrupt is used to place data in the intermediate buffer. Circular here means that instead of always beginning storing from address zero, it continues storing from where it is currently positioned. When it reaches the end it moves back to position zero. For each new data package a counter is incremented by one. The counter keeps track of how much is stored in the intermediate buffer and is owned by both the interrupt and the super loop. For each cycle, the counter is checked by the superloop. When the counter differs from zero, a PCcom function is activated (cf. what has been previously described in this document). The PCcom interprets the information by means of a read-pointer and decides whether it is part of an ESC command or data. Data is placed by means of another write pointer in a data buffer with a capacity of 129 bytes. The read-pointer is cyclic and is owned by the superloop. However, the write-pointer for the data buffer is not cyclic, but starts from position zero with each new storing sequence. This pointer is owned by the superloop. The data buffer now contains data that is ready to be transferred by the PCcom. The PCcom can point directly at the desired data byte.

To simplify programming, two separate software buffers are used, one for each interrupt. The software buffers have been allocated the minimum size that is possible without impairing communication. The reason is that they take up space in the RAM memory, which is only, for example, 2 KB. Since the computer transmits a maximum of 129 bytes per sequence, this is an appropriate size of the PCcom data buffer.

The same concept is used for reception from the machine 100 as for reception from the computer 120. The difference is that the portable device 200 uses another intermediate buffer and another data buffer. These buffers are of a different size. The intermediate buffer size is 15 bytes and the data buffer size is 10 bytes.

A common software buffer with a size of 920 bytes is used for transmission to the computer 120 and the machine 100. The transmission is not controlled by interrupts, but is handled by the superloop. The superloop keeps track of where data is to be sent by means of flags.

The external memory management, i.e. managing data transfer to and from the external memory, is carried out by means of functions. To write to the memory, a write function is called with data and address as input parameters. For reading, a read function is called with address as input parameter, and data is returned.

The two memory modules are combined to form a block using low-level software. From the outside this is seen as a large continuous memory with linear addressing from 0x00000-0xFFFFF, i.e. 1 MB.

EXAMPLE

Bytes a and b are programmed to the addresses x and y (a and b are placed in different sectors). The following occurs:

1) The sector containing the address x is copied from the external memory to the memory management buffer in the microcontroller RAM. This does not take place if the sector in question is already present in the RAM.

2) Byte a is placed at address x in the memory management buffer.

3) The sector containing address x in the external memory is erased.

4) The memory management buffer is programmed to the current sector in the external memory.

5) The sector containing address y is copied from the external memory to the memory management buffer.

6) Byte b is placed at address y in the memory management buffer.

Byte b is not programmed to the external memory until a sector change or "timeout" occurs.

The program flow according to FIG. 9 starts with an initialization (steps 900–920) before the superloop is entered (steps 922–938). During initilization the following takes place:

The program begins by initializing all global variables in step 902. The external clock frequency (X1) of the CPU is set until the oscillator has been stabilized. The internal clock (DCO) is set to 500 kHz. The direction of the ports is set.

The program then checks whether the external flash memory is OK in step 904. If the memory is not OK an error message is indicated in step 906 by means of the light emitting diodes 720/230–232. However, if the memory is OK the program carries out the last initializations in step 908:

The AD converter is set to convert 15 times per second. A timer is initialized so that it generates an interrupt every 100 ms. The transfer speed is set to 9600 baud. The real time clock (RTC) is set to an arbitrary time and date.

The global interrupt is then enabled in step 910. In step 912, the program checks whether there is any configuration data stored in the external memory. If not, a basic configuration is programmed to the memory in step 914.

In steps 916 and 918, the machine and the computer are given permission to send. Finally, the RTC timer is started in step 920. This completes the initialization part.

Figure 10:
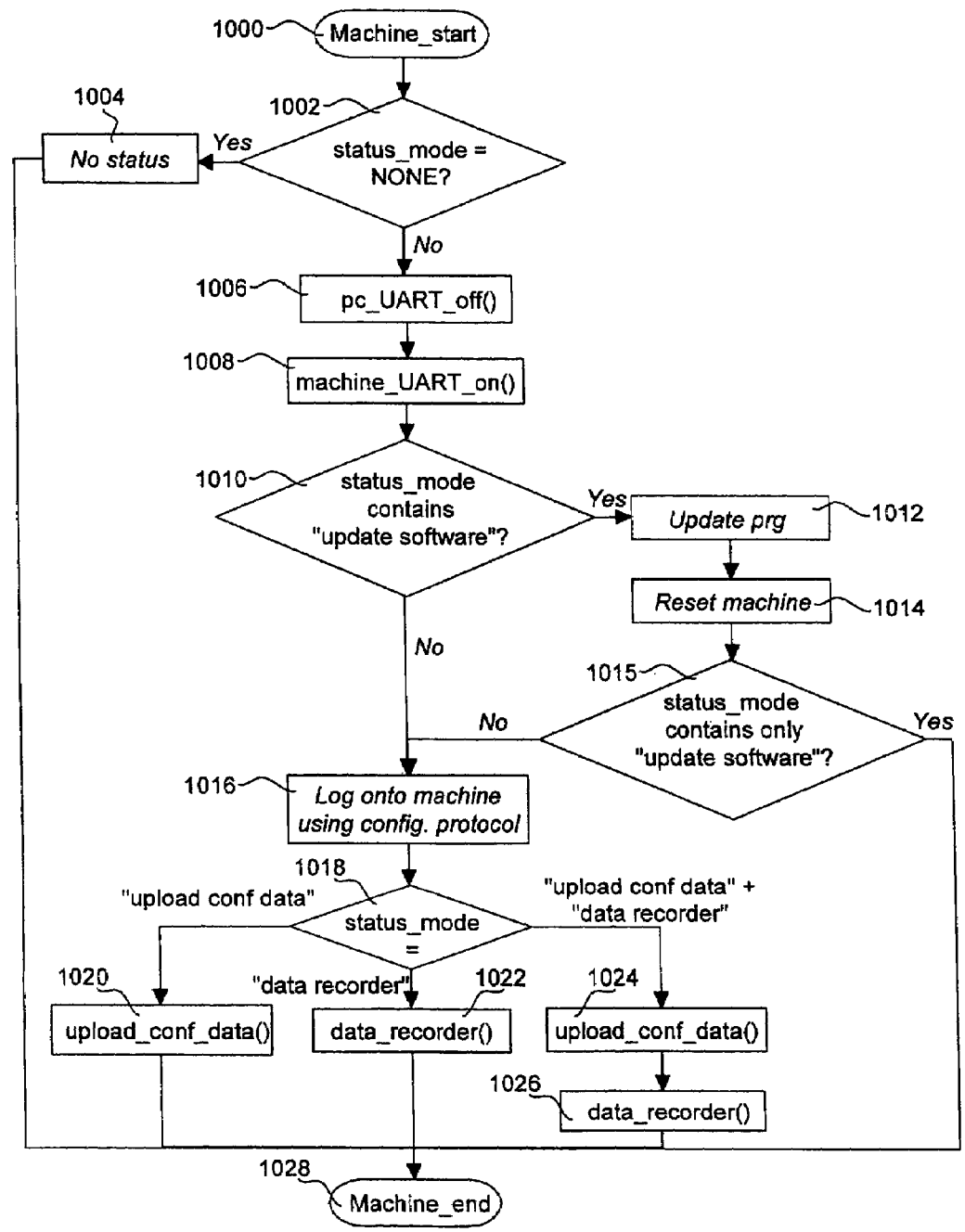
FIG. 10 is a flowchart of a routine for the portable device in the case where it is connected to the machine in the way illustrated in FIG. 5.
Figure 11:
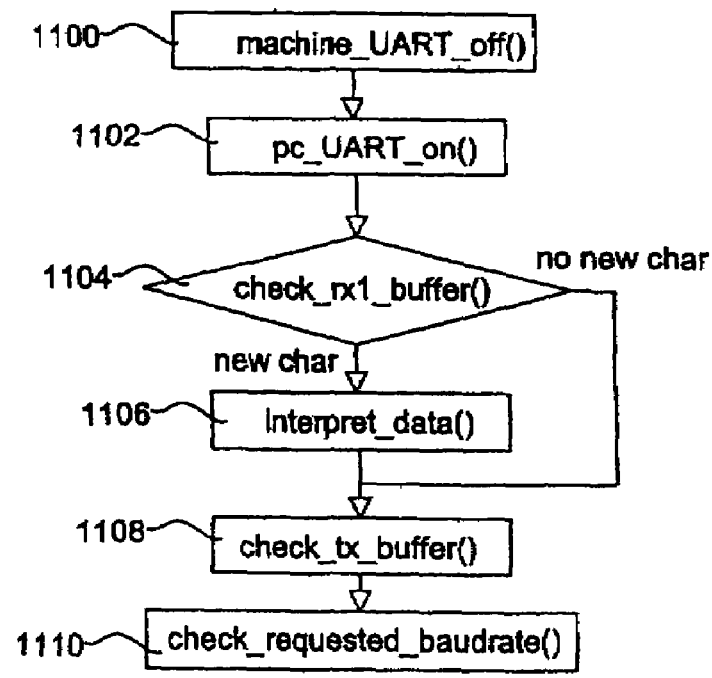
FIG. 11 is a flowchart of a routine for the portable device in the case where it is connected to the computer in the way illustrated in FIG. 3.

In the superloop, the RTC is updated in step 922. In steps 924 and 926, a check is then carried out to determine whether a timeout has occurred and which message is to be displayed. The program then checks, in step 928, for anything connected to the communication units. The following three cases are possible:

Only the computer is connected (step 932, FIG. 11).
Only the machine is connected (step 930, FIG. 10).
Both the computer and the machine are connected (steps 934–936).

When only the computer is connected, the following takes place, as shown in FIG. 11. The UART driver of the machine is turned off in step 1100, and the UART driver of the computer is turned on in step 1102. In step 1104, a check is carried out to determine whether any new character has been received from the computer. If so, the PCcom is run in step 1106. This step is designed to interpret the incoming data from the configuration program of the computer in the same way as the machine would have done if the machine had been connected directly to the computer. A check is then carried out, in step 1108, to determine if any character has to be transmitted to the computer. Finally, a check is carried out in step 1110 to determine whether the computer has requested a change of transfer speed.

When only the machine is connected, the following takes place, as shown in FIG. 10. To simplify the use of the portable device, different tasks are allocated and stored in "status_mode". The program checks "status_mode" and carries out the task in question depending on the current "status_mode". There are, in all, eight different ways of combining "status_mode":

No "status_mode" selected (step 1002, 1004): The execution is terminated. Otherwise, the communication unit 740 connected to the computer is turned off in step 1006, while the communication unit 750 connected to the machine is turned on in step 1008.

Update the machine software (step 1010, 1012): Machine logon according to a predefined program updating protocol. After the update, the machine software is relaunched in step 1014. If "status_mode" indicates anything in addition to program update (which is checked in step 1015), the execution proceeds with a machine logon according to a predefined configuration protocol (step 1016).

Upload configuration data: Update configuration data in the machine (steps 1018, 1020 and 1024, respectively).

Data recorder: Record operating data from the machine and store it in external flash memory (step 1018, 1022 and 1026, respectively). Recorded operating data can then be transferred to the computer for analysis or the like. As already mentioned, such operating data may comprise number/validity/authenticity/denomination/type of coins and valuable papers, respectively, that have been handled by the machine, and/or physical parameters detected by the machine for such coins and valuable papers, and/or a service log for said machine. The service log may pertain to service operations performed, such as cleaning, repair or exchange of machine parts, date and/or time for such operations, etc.

In some embodiments, the portable device is adapted to store configuration data for more than one machine type or model. In one such embodiment, after having determined in step 928 that there is a machine connected to the portable device, the control unit 700 will identify the type or model of this machine, for instance by requesting the machine to provide information sufficient to determine its type or model. Then, the control unit 700 will select, among all the stored configuration data, the particular set of data which is designed for the identified machine type or model. After this, the routine of FIG. 10 will be performed as has been described above.

When both the computer and the machine are connected, both communication units 740, 750 are turned on in steps 934 and 936. In this state, the portable device 200 is transparent to the computer and the machine. Its task is only to store important information and forward all the incoming information.

The invention has been described above by means of two exemplary embodiments. However, the invention is not in any way limited to these embodiments, but includes many variants within the scope of the invention as defined by the appended claims, as is readily realized by a person skilled in the art. Accordingly, one alternative is to use the same physical communication port and/or communication unit of the portable device for the connection to the computer as well as for the connection to the machine. In such an embodiment, the control unit of the portable device will be adapted to recognize which of the computer and the machine that is currently connected, and to act on the basis thereof.

The invention claimed is:

1. A portable device for configuring a machine of the type which handles coins or valuable papers and which has an interface for connecting an external unit, thereby allowing the machine to be configured from the external unit, the portable device being characterized by
    a control unit;
    a memory;
    a first interface adapted to be connected to said external unit; and
    a second interface adapted to be connected to the interface of said machine;
    the control unit being adapted, when the portable device is connected to the external unit via the first interface, to emulate said machine and to receive configuration data intended for said machine from the external unit and store it in the memory, and
    the control unit being adapted, when the portable device is connected to said machine via the second interface, to emulate the external unit and deliver said configuration data stored in the memory to said machine.

2. A portable device as claimed in claim 1, wherein the external unit is a computer of the type including a portable computer, a personal computer, a haudheld computer, a workstation or the like.

3. A portable device as claimed in claim 1, wherein the first and second interfaces are serial.

4. A portable device as claimed in claim 3, wherein power is supplied to the device from the first and second serial interfaces.

5. A portable device as claimed in claim 1, wherein said configuration data comprises at least one of the following: settings and/or parameters relating to validity/authenticity/denomination/type of coins and valuable papers, respectively; reference data; or language support data.

6. A portable device as claimed in claim 1 wherein said configuration data comprises software adapted to be executed in a microprocessor incorporated in the machine.

7. A portable device as claimed in claim 1,
    wherein the control unit is adapted, when the portable device is connected to said machine via the second interface, to receive operating data from said machine and store it in the memory; and
    wherein the control unit is adapted, when the portable device is connected to the external unit via the first interface, to transfer said operating data stored in the memory to the external unit.

8. A portable device as claimed in claim 7, wherein said operating data comprises number/validity/authenticity/denomination/type of coins and valuable papers, respectively, that have been handled by the machine, and/or physical parameters detected by the machine for such coins and valuable papers, and/or a service log for said machine.

9. A portable device as claimed in claim 1, wherein the first and the second interface form part of the same physical unit.

10. A portable device as claimed in claim 1, wherein said machine is a coin sorter or a coin counter.

11. A method of configuring a machine of the type which handles coins or valuable papers and which can be configured from an external unit, the method being characterized by the steps of
    providing a portable device, other than said machine and said external unit;
    detecting, in said portable device, that said portable device is connected to said external unit;
    emulating said machine by said portable device so as to receive configuration data intended for said machine from the external unit and store said configuration data in the portable device;
    detecting, in said portable device, that said portable device is connected to said machine; and
    emulating said external unit by said portable device so as to deliver said stared configuration data to said machine.

12. A method as claimed in claim 11, wherein the external unit is a computer of the type including a portable computer, a personal computer, a handheld computer, a workstation or the like.

13. A method as claimed in claim 11, wherein said configuration data comprises at least one of the following: settings and/or parameters relating to validity/authenticity/denomination/type of coins and valuable papers, respectively; reference data; or language support data.

14. A method as claimed in claim 11, wherein said configuration data comprises software adapted to be executed in said machine.

15. A method as claimed in claim 11,
    wherein, in said step of emulating said external unit by said portable device, operating data is received from said machine and stored in said portable device, and wherein, in said step of emulating said machine by said portable device, said stored operating data is transferred to said external unit.

16. A method as claimed in claim 15, wherein said operating data comprises number/validity/authenticity/denomination/type of coins and valuable papers, respectively, that have been handled by the machine, and/or physical parameters detected by the machine for such coins and valuable papers, and/or a service log for said machine.

17. A method as claimed in claim 11, wherein said machine is a coin sorter or a coin counter.

18. A method as claimed in claim 11 wherein emulating said machine by said portable device comprises executing a computer program comprising an initialization and a superloop.

19. A method as claimed in claim 18 wherein said portable device comprises a memory having an intermediate buffer and a data buffer and emulating said machine by said portable device comprises executing an interrupt to store said configuration data in the intermediate buffer and placing the data in a data buffer.

20. A method of claim 19 wherein emulating said external unit by said portable device comprises executing the computer program to transfer said configuration data from the data buffer to a memory of the machine.

* * * * *

UNITED STATES PATENT AND TRADEMARK OFFICE
CERTIFICATE OF CORRECTION

| | |
|---|---|
| PATENT NO. | : 7,134,009 B2 |
| APPLICATION NO. | : 10/689473 |
| DATED | : November 7, 2006 |
| INVENTOR(S) | : Manfred Jonsson |

It is certified that error appears in the above-identified patent and that said Letters Patent is hereby corrected as shown below:

In the claims:

Column 12, claim 11, line 50, "stared" should be changed to --stored--.

Signed and Sealed this

Sixth Day of March, 2007

JON W. DUDAS
*Director of the United States Patent and Trademark Office*